(12) United States Patent
Mohankumar et al.

(10) Patent No.: US 11,208,895 B2
(45) Date of Patent: Dec. 28, 2021

(54) GAS TURBINE ENGINE

(71) Applicant: ROLLS-ROYCE plc, London (GB)

(72) Inventors: Benjamin Mohankumar, Cambridge (GB); Mark J Wilson, Kirkby-in-Ashfield (GB); Cesare A Hall, Cambridge (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/064,667

(22) Filed: Oct. 7, 2020

(65) Prior Publication Data

US 2021/0222563 A1  Jul. 22, 2021

(30) Foreign Application Priority Data

Nov. 14, 2019  (GB) ..................... 1916546

(51) Int. Cl.
*F01D 5/14* (2006.01)
(52) U.S. Cl.
CPC ........ *F01D 5/141* (2013.01); *F05D 2220/323* (2013.01); *F05D 2240/304* (2013.01)
(58) Field of Classification Search
CPC ........................ F01D 5/141; F05D 2240/304
See application file for complete search history.

(56) References Cited

U.S. PATENT DOCUMENTS

| 2010/0260609 | A1* | 10/2010 | Wood | ............ | F04D 29/384 |
| | | | | | 416/223 R |
| 2013/0189117 | A1* | 7/2013 | Baltas | ............ | F01D 5/141 |
| | | | | | 416/243 |

FOREIGN PATENT DOCUMENTS

EP          0801230 A2 * 10/1997  ........... F04D 29/324

* cited by examiner

*Primary Examiner* — Woody A Lee, Jr.
*Assistant Examiner* — Brian Christopher Delrue
(74) *Attorney, Agent, or Firm* — Oliff PLC (57) ABSTRACT

A gas turbine engine for an aircraft including: an engine core including a turbine, compressor, and core shaft connecting turbine to the compressor; a fan located upstream of engine core, the fan containing a plurality of fan blades mounted for rotation about an engine axis, each blade of the plurality of fan blades having a leading edge and trailing edge extending across a span of an airflow duct from blade root to tip; and a gearbox that receives an input from core shaft and outputs drive to fan so as to drive the fan at a lower rotational speed than the core shaft, wherein the trailing edge of each blade is characterized by a metric M defined as a rate of change of an angle of trailing edge between 0.4 and 0.8 of the span divided by an area averaged trailing edge angle, M being not less than around 4.

20 Claims, 5 Drawing Sheets

GAS TURBINE ENGINE

The present disclosure relates to a gradient of a trailing edge angle of fan blades in a gas turbine engine.

The ability of a fan in a turbofan gas turbine engine to deliver thrust during high angle of attack flight conditions is an important factor, particularly when considering engines having larger fan diameters, such as for example 2 metres and above. An improved thrust at high angles of attack can permit a shorter intake length, leading to an overall fuel burn reduction.

According to a first aspect there is provided a gas turbine engine for an aircraft comprising:
- an engine core comprising a turbine, a compressor, and a core shaft connecting the turbine to the compressor;
- a fan located upstream of the engine core, the fan comprising a plurality of fan blades mounted for rotation about an engine axis, each blade of the plurality of fan blades having a leading edge and a trailing edge extending across a span of an airflow duct from a blade root to a blade tip; and
- a gearbox that receives an input from the core shaft and outputs drive to the fan so as to drive the fan at a lower rotational speed than the core shaft,
- wherein the trailing edge of each blade is characterized by a metric M defined as a rate of change of an angle of the trailing edge between 0.4 and 0.8 of the span divided by an area averaged trailing edge angle, M being not less than around 4.

It has been found that the radial gradient of the fan trailing edge angle, particularly between 0.4 and 0.8 of the span of the fan blade, significantly influences the amount of thrust at high angles of attack. Designs that incorporate such radial gradients as defined herein are able to deliver a higher thrust, thereby allowing for a shorter intake length and an overall fuel burn reduction. This may be particularly beneficial for designs incorporating larger fan diameters, where the inlet flow to the fan becomes more distorted.

The metric may in some cases be not less than around 5, in other cases not less than around 7.5, or alternatively not less than around 9.

The metric may be not greater than around 80.

The metric M may be defined as $$M = \frac{\left(\frac{|\chi_{0.8} - \chi_{0.4}|}{0.8 - 0.4}\right)}{\tilde{\chi}}$$

where $\chi_f$ is the trailing edge angle at a fraction f from the blade root to the blade tip and $\tilde{\chi}$ is the area averaged trailing edge angle from the blade root to the blade tip.

The area averaged trailing edge angle may be calculated from a continuous or discrete function, i.e. may be a continuous or discrete area averaged trailing edge angle.

The area averaged trailing edge angle $\tilde{\chi}$ may be defined as $$\tilde{\chi} = \frac{\chi_{0.1}\pi(r_{0.2}^2 - r_{hub}^2) + \chi_{0.3}\pi(r_{0.4}^2 - r_{0.2}^2) + \chi_{0.5}\pi(r_{0.6}^2 - r_{0.4}^2) + \chi_{0.7}\pi(r_{0.8}^2 - r_{0.6}^2) + \chi_{0.9}\pi(r_{tip}^2 - r_{0.8}^2)}{\pi(r_{tip}^2 - r_{hub}^2)}$$

where $r_f$ is the radius from the engine axis at a fraction f of the span from the blade root to the blade tip, the radius $r_{tip}$ being the radius at the blade tip and $r_{hub}$ the radius at the blade root.

The rate of change of the trailing edge angle between 0.4 and 0.8 of the span from the blade root to the blade tip may be between around 65 and 150 degrees, 85 and 150 degrees or 100 and 150 degrees.

The rate of change of the trailing edge angle between 0.4 and 0.8 of the span may be defined as $$\left(\frac{|\chi_{0.8} - \chi_{0.4}|}{0.8 - 0.4}\right)$$

where $\chi_f$ is the trailing edge angle at a fraction f of the span from the blade root to the blade tip.

With the gas turbine engine operating at cruise conditions, a fan root pressure ratio may be no greater than 1.30, 1.25 or 1.24.

With the gas turbine engine operating at cruise conditions, a ratio between the fan root pressure ratio and a fan tip pressure ratio may be less than 0.95, 0.92 or 0.9, and optionally greater than 0.7, the fan tip pressure ratio being defined as a ratio of the mean total pressure of the flow at the fan exit that subsequently flows through the bypass duct to the mean total pressure of the flow at the fan inlet.

With the gas turbine engine operating at cruise conditions, a fan tip loading $dH/U_{tip}^2$ may be within a range of from 0.25 to 0.4 $JKg^{-1}K^{-1}/(ms^{-1})^2$, optionally 0.28 to 0.33 $JKg^{-1}K^{-1}/(ms^{-1})^2$, optionally 0.28 to 0.3 $JKg^{-1}K^{-1}/(ms^{-1})^2$, where dH is an enthalpy rise across the fan and $U_{tip}$ is a velocity of the fan tip.

With the gas turbine engine operating at cruise conditions, a bypass ratio may be greater than around 12, optionally greater than around 13, the bypass ratio being a mass flow rate through the engine of a bypass flow around the core to a mass flow rate of a flow through the core.

With the gas turbine engine operating at cruise conditions, a specific thrust of the engine may be less than 100 $NKg^{-1}$ $s^{-1}$, optionally less than 90 $NKg^{-1}$ $s^{-1}$, optionally in the range of from 70 to 90 $NKg^{-1}$ $s^{-1}$.

For each fan blade, a ratio of the radius at the fan root to the radius the fan tip may be less than 0.33, optionally in the range of from 0.25 to 0.33, optionally on the order of 0.3.

Where the turbine is a first turbine, the compressor is a first compressor, and the core shaft is a first core shaft, the engine core may further comprise a second turbine, a second compressor, and a second core shaft connecting the second turbine to the second compressor, and the second turbine, second compressor, and second core shaft may be arranged to rotate at a higher rotational speed than the first core shaft.

A combustor may be provided downstream of the fan and compressor(s) and upstream of the turbine(s), and a ratio of the fan root pressure ratio to an overall pressure ratio may be less than 0.03, the overall pressure ratio being defined as a ratio of the mean total pressure of the flow at the inlet to the combustor (conventionally termed P106) to the mean total pressure of the flow at the fan inlet (conventionally termed P100).

The ratio of the fan root pressure ratio to the overall pressure ratio may be in a range of from 0.017 to 0.028, optionally 0.02 to 0.026.

An outer diameter of the fan may be as defined herein, for example greater than 240 cm, optionally within a range of 240 cm to 280 cm or a range of 330 cm to 400 cm.

A ratio of intake length to an outer diameter of the fan may be in the range of from 0.15 to 0.6, optionally 0.15 to 0.5, 0.2 to 0.45 or 0.25 to 0.4, wherein the intake length of the engine is defined as a length along the engine axis of the airflow duct upstream of the fan.

According to a second aspect, there is provided a gas turbine engine for an aircraft comprising:

an engine core comprising a turbine, a compressor, and a core shaft connecting the turbine to the compressor;

a fan located upstream of the engine core, the fan comprising a plurality of fan blades mounted for rotation about an engine axis, each blade of the plurality of fan blades having a leading edge and a trailing edge extending across a span of an airflow duct from a blade root to a blade tip; and a gearbox that receives an input from the core shaft and outputs drive to the fan so as to drive the fan at a lower rotational speed than the core shaft, wherein a rate of change of an angle of the trailing edge of each blade between 0.4 and 0.8 of the span from the blade root to the blade tip is between around 60 and 150 degrees.

The rate of change of the trailing edge angle between 0.4 and 0.8 of the span may be defined as $$\left(\frac{|\chi_{0.8} - \chi_{0.4}|}{0.8 - 0.4}\right)$$

where $\chi_f$ is the trailing edge angle at a fraction f of the span from the blade root to the blade tip.

Other features defined above in relation to the first aspect may also be applied to the gas turbine engine of the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
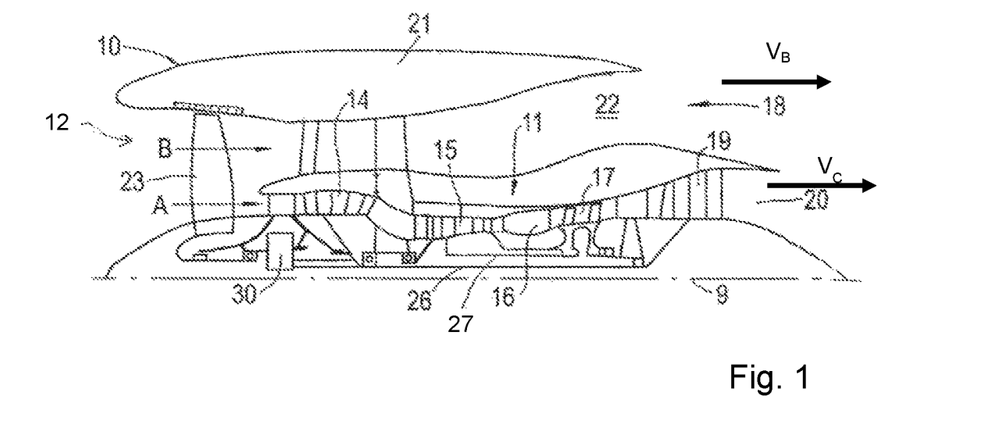
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust.

The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
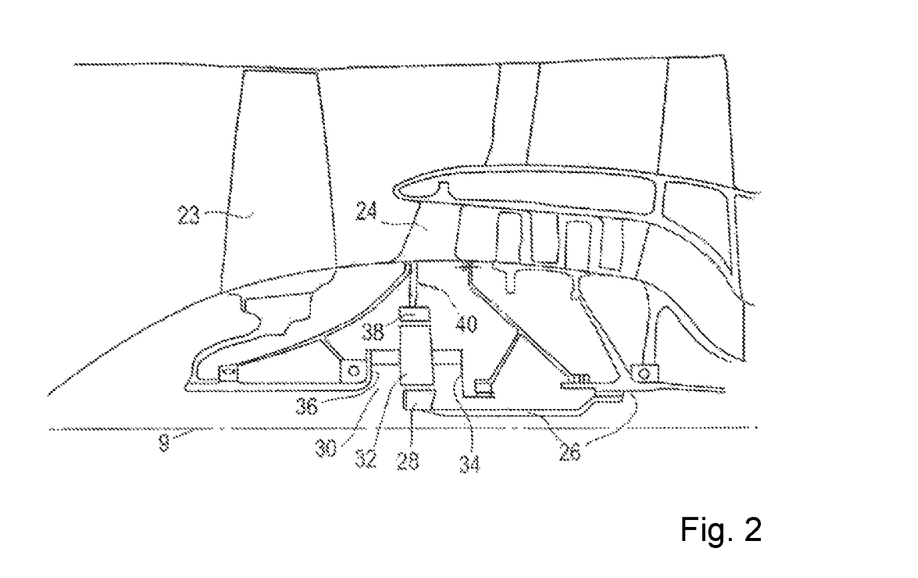
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
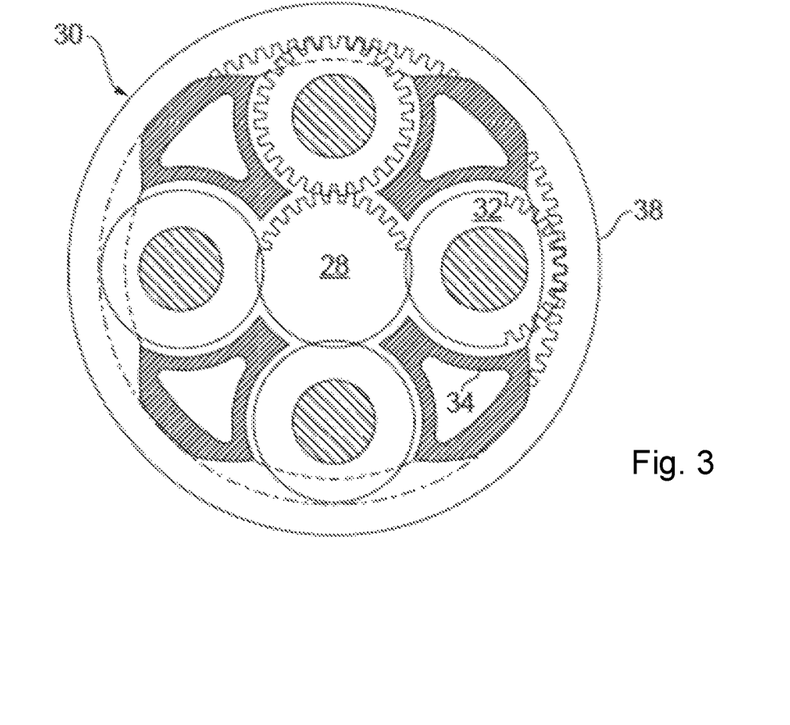
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Aircraft must be certified to fly at extreme climb and descent manoeuvres where the angle of attack (AOA) is high. Under these conditions, the engine's ability to deliver thrust is critical for flight safety. However, the air flow entering the fan is heavily distorted, which degrades the fan performance. Analysis shows that short intake lengths, particularly in combination with larger fan diameters, increases the severity of this distortion, further degrading fan performance and engine thrust. A fan aerodynamic design methodology is therefore required that better manages the flow distortion delivered by a short intake to ensure a high thrust can continue to be delivered at high AOA.

Figure 4A:
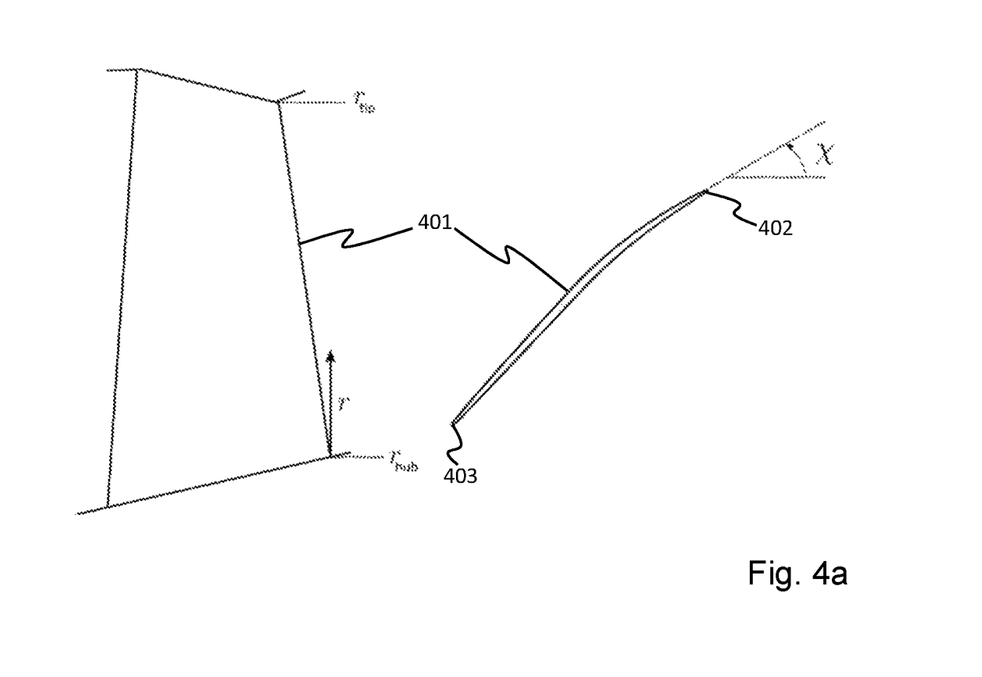
FIG. 4a is a schematic representation of an example fan blade, in side and sectional views.

FIG. 4 illustrates an example fan blade 401, in side (left) and sectional (right) views. In the side view, the fan hub, or root, radius $r_{hub}$ and fan tip radius $r_{tip}$ at the trailing edge of the blade 401 are indicated. The general direction of measurement of the radius r is indicated, being orthogonal to the engine axis 9 (FIG. 3). In sectional view, the fan blade 401 is characterized by, among other parameters, a trailing edge angle χ, which is defined as the angle the trailing edge 402 makes with respect to the engine axis. The trailing edge angle χ may be positive or negative, and may vary between positive and negative over the span of the blade, as shown in more detail below in relation to the examples in FIG. 5. A positive angle may be defined as being measured anti-clockwise from the engine axis, whereas a negative angle may be defined as being measured clockwise from the engine axis. In the example illustrated in FIG. 4a the trailing edge angle χ is positive.

The section shown in FIG. 4 represents a cross-sectional plane through the blade 401 defined by an extrusion in the circumferential direction of a straight line formed between a point on the leading edge 403 that is at a given percentage X of the span s from the root (i.e. at a radius of ($r_{root}$+X/100*($r_{tip}$−$r_{root}$))), and a point on the trailing edge 402 that is at the same radial percentage X of a trailing edge radial extent along the trailing edge 402 from the root at the trailing edge 402. The circumferential direction of the extrusion may be taken at the leading edge position of the plane. In other words, reference to a cross-section through the blade 401 at a given percentage along the blade span (or a given percentage span position) may mean a section through the aerofoil in a plane defined by: a line that passes through the point on the leading edge 403 that is at that percentage of the span s along the leading edge from the leading edge root and points in the direction of the tangent to the circumferential direction at that point on the leading edge; and a point on the trailing edge 402 that is at that same percentage along the trailing edge 402 from the trailing edge root.

Figure 4B:
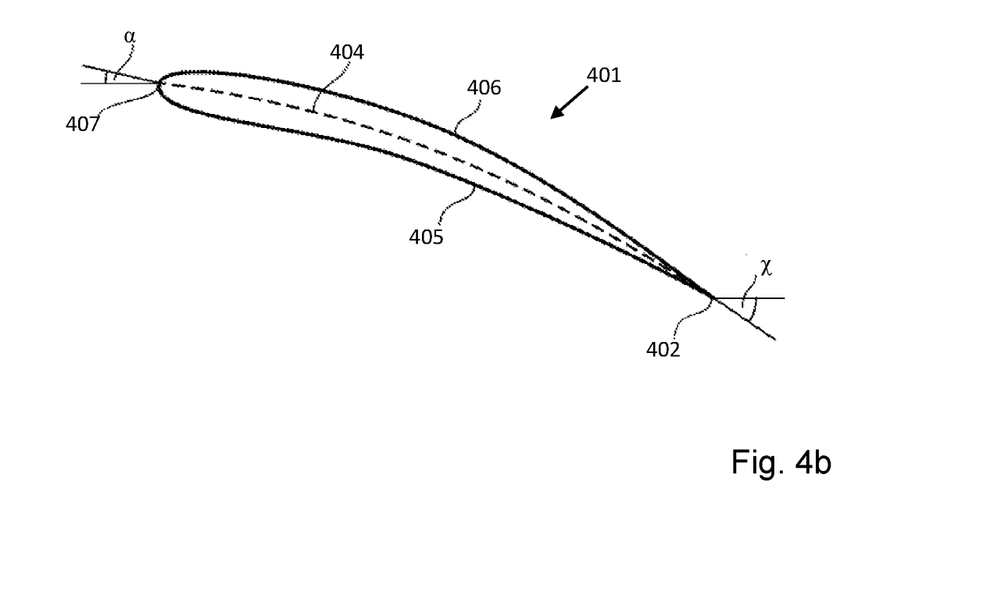
FIG. 4b is a schematic sectional representation of an alternative example fan blade.

A further example of a cross-section taken through a blade 401 is shown in FIG. 4b, with the plane being defined as above. The cross-section of the blade 401 has a camber line 404. In general, the camber line 404 may be defined as a line formed by the points in a cross-section at a span s of the blade that are equidistant from a pressure surface 405 and a suction surface 406 for that cross-section. The camber of the blade 401 at a given cross-section (which may also be referred to as the camber of the blade at a given span position) may be defined as the change in angle of the camber line 404 between the leading edge 407 and the trailing edge 402, that is to say (χ−α) in the FIG. 4b example. In this example, both the leading edge and trailing edge angles are negative, using the convention described above. The trailing edge angle χ at a given cross-section at a span s may be defined as the angle of the camber line 404 with respect to the engine axis at the trailing edge 402 of the blade 401. Similarly, the leading edge angle α at a given cross-section at a span s may be defined as the angle of the camber line 404 with respect to the engine axis at the leading edge 407 of the blade 401.

Figure 5:
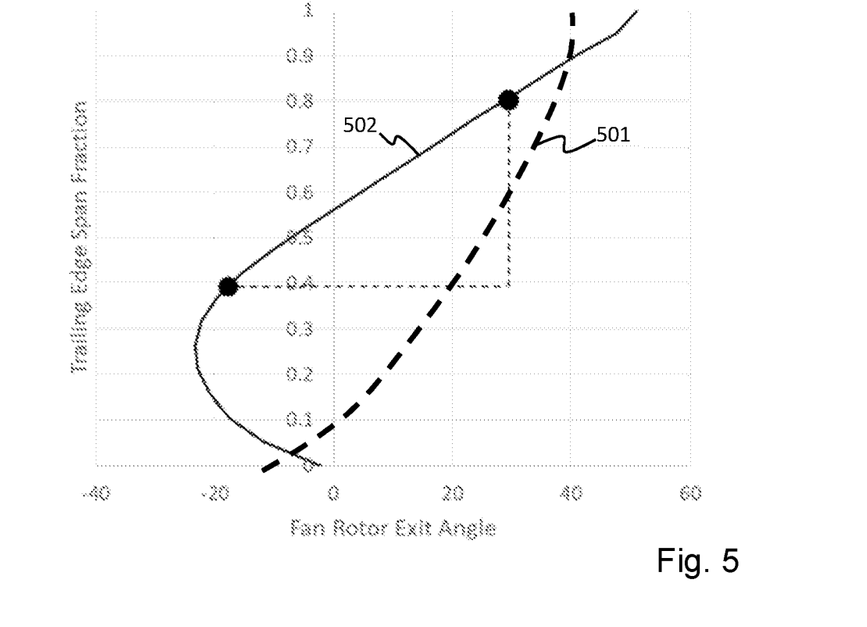
FIG. 5 is a plot of fan rotor trailing edge angle as a function of span fraction for two example fan blades.

FIG. 5 is a plot of fan rotor trailing edge angle as a function of span fraction from 0 to 1, with 0 being at the fan root and 1 at the fan tip. In a first example 501, the trailing edge angle is shown for a fan rotor as disclosed in US 2013/0189117 A1. This fan rotor is described as having a "flat profile" and exhibits a variation in trailing edge angle from around +20 degrees at 0.4 span fraction to around +35 degrees at 0.8 span fraction, making an angle gradient of (35−20)/(0.8−0.4)=15/0.4=37.5 degrees. In a second example 502, being in accordance with the present disclosure, the trailing edge angle varies from around −18 degrees at 0.4 span fraction to around +35 degrees at 0.8 span fraction, making an angle gradient of (35+18)/(0.8−0.4)=53/0.4=132.5 degrees.

Fan blades having a small change in trailing edge angle between 0.4 and 0.8 span fraction have been found to perform poorly at high angles of attack. This can be significantly improved by increasing the change in trailing edge angle over the 0.4 to 0.8 span fraction range.

The following terminology may be applied when considering the various relevant parameters for fan blades:

r=Trailing edge radius $$h = \frac{r - r_{hub}}{r_{tip} - r_{hub}} = \text{Trailing edge span fraction}$$

χ=Trailing edge exit angle [degrees]
$y_x$=Arbitrary parameter at x trailing edge span fraction
χ̄=Area-averaged trailing edge angle [degrees]
M=Radial gradient metric The radial gradient metric M may be defined as the rate of change of the angle χ of the trailing edge between 0.4 and 0.8 of the span divided by an area averaged trailing edge angle, i.e.

$$M = \frac{\left(\frac{|\chi_{0.8} - \chi_{0.4}|}{0.8 - 0.4}\right)}{\tilde{\chi}}$$

The value of the metric M may be at least (i.e. not less than) around 4, optionally not less than around 7.5, and further optionally not less than around 9. An upper limit for the metric M may be around 80.

The area averaged trailing edge angle $\tilde{\chi}$ may be calculated by integrating the trailing edge angle $\chi$ multiplied by the area interval $\pi((r+\delta r)^2 - (r-\delta r)^2)$ over the whole span of the blade from 0 to 1, divided by the total swept area $\pi(r_{tip}^2 - r_{hub}^2)$ of the fan blade. The integral may be calculated by integrating a continuous function defining the trailing edge angle along the blade span, or alternatively may be calculated using discrete intervals along the blade span. In one example the discrete intervals may be ±0.1 of the blade span at 0.1, 0.3, 0.5, 0.7 and 0.9 of the span, and the trailing edge angle $\tilde{\chi}$ calculated as:

$$\tilde{\chi} = \frac{\chi_{0.1}\pi(r_{0.2}^2 - r_{hub}^2) + \chi_{0.3}\pi(r_{0.4}^2 - r_{0.2}^2) + \chi_{0.5}\pi(r_{0.6}^2 - r_{0.4}^2) + \chi_{0.7}\pi(r_{0.8}^2 - r_{0.6}^2) + \chi_{0.9}\pi(r_{tip}^2 - r_{0.8}^2)}{\pi(r_{tip}^2 - r_{hub}^2)}$$

According to an alternative aspect, the gradient, or rate of change, of the trailing edge angle $$\frac{d\chi}{ds}$$

between 0.4 and 0.8 of the fan blade span, where s is the span fraction, may be used to define the fan blade, i.e.:

$$\frac{d\chi}{ds} = \left(\frac{|\chi_{0.8} - \chi_{0.4}|}{0.8 - 0.4}\right)$$

The gradient may be between around 85 and 150 degrees.

Figure 6:
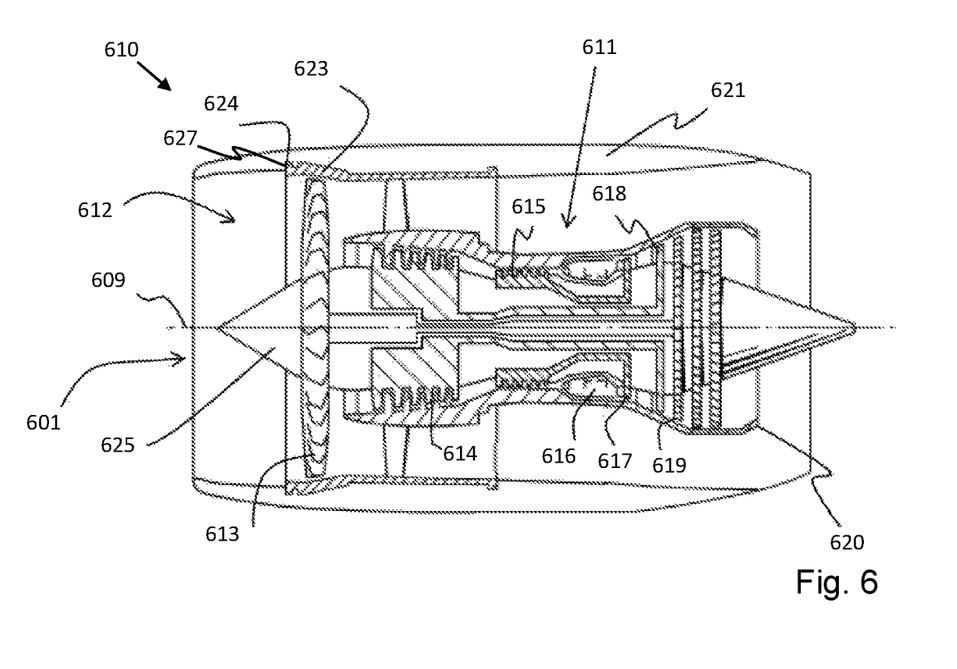
FIG. 6 is a schematic sectional side view of an alternative example gas turbine engine.

FIG. 6 illustrates an alternative example gas turbine engine 610, comprising an engine core 611 and air intake assembly 601. The engine core 611 has an engine main axis 609 and comprises, in axial flow series, a propulsive fan 613 housed within a respective fan case 623, an intermediate pressure compressor 614, a high-pressure compressor 615, combustion equipment 616, a high-pressure turbine 617, an intermediate pressure turbine 618, a low-pressure turbine 619 and an exhaust nozzle 620. The fan 613 may comprise a nose cone 625. The fan 613, compressors 614, 615 and turbines 617, 618, 619 all rotate about a same axis of rotation and so define the engine main axis 609 of the engine core 611.

The intake 612 is connected to the fan case 623, in particular to a forward connecting face 627 of the fan case 623, known as A1 flange, so defining a connecting interface 624. The intake 612 may be part of a nacelle 621. Alternatively, the intake 612 may be a separate component and connected to the nacelle 621 in any suitable way.

Figure 7:
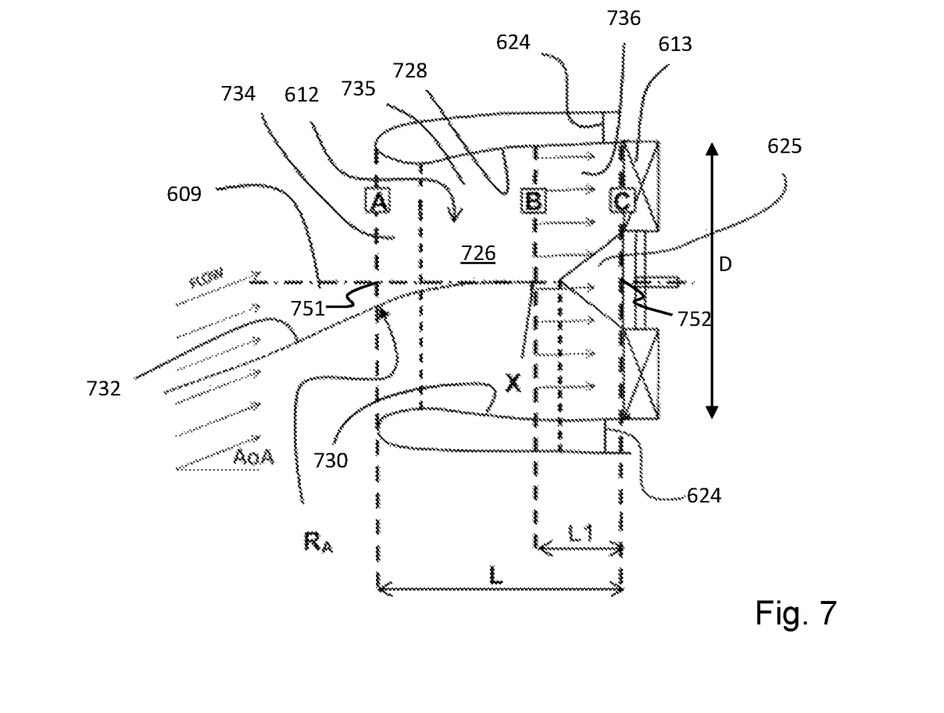
FIG. 7 is a schematic sectional side view of a forward part of an example air intake assembly.

FIG. 7 schematically illustrates an air intake 612 and fan 613 of an example gas turbine engine. The air intake 612 is connected to the forward connecting face 627 of the fan case 623 (see FIG. 6) to define an intake passage 726 extending between an inlet highlight A at a first end and an upstream face C of the fan 613 at a second end. The intake passage 726 comprises, in flow series, an intake lip 734, a diffuser 735 and a straight conditioning duct 736. The diffuser 735 illustrated in FIG. 7 is cambered. In other examples the diffuser 735 may not be cambered.

The straight conditioning duct 736 is arranged downstream of the cambered diffuser 735. More particularly, the straight conditioning duct 736 is connected to an exit B of the cambered diffuser 735. Moreover, the straight conditioning duct 736 is arranged immediately upstream of the fan 713 and extends axially for a length L1.

The intake passage 726 features upper and lower inner walls, the intersection of which with a meridional plane containing the engine main axis 11 defines, respectively, an upper inner profile 728 and lower inner profile 730 of the intake passage 26. A camber line 732 is defined by the locus of the centres of the circles tangent to both the upper inner profile 728 and lower inner profile 730.

The camber line 732 intersects the engine main axis 609 upstream of the fan 613 at an intersecting point X. The camber line 732 extends between the intersecting point X and the upstream face C of the fan 613 for a length L1. Upstream of the intersecting point X the camber line 732 lies below the engine main axis 609.

An intake length of the gas turbine engine air intake assembly 601 is defined by a length L, which in FIG. 7 is the length along the engine axis 609 between the inlet highlight of the air intake assembly 601 and the upstream face of the fan 623 respectively, and in particular the length between respective points 751, 752 on the engine axis 609 that intersect the inlet highlight A and upstream face C of the fan 613. The inlet highlight may be defined as the plane contacting the forwardmost surface of the air intake assembly 601. In the example in FIG. 7 the inlet highlight plane A is orthogonal to the engine axis 609. The plane C of the upstream face of the fan 613 is orthogonal to the engine axis 609, and contacts the forwardmost point on each fan blade of the fan 613, which may be at the fan root, the fan tip or at any point in between.

A ratio of the intake length L to an outer diameter D of the fan 613 may be in the range of from 0.15 to 0.6, optionally 0.15 to 0.5, 0.2 to 0.45 or 0.25 to 0.4, wherein the intake length of the engine is defined as above, i.e. a length along the engine axis 609 of the airflow duct 726 upstream of the fan 613.

Figure 8:
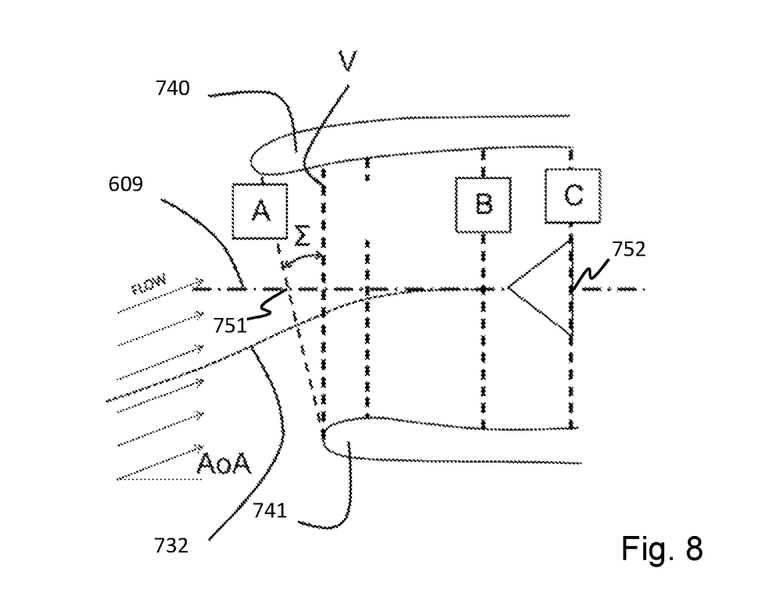
FIG. 8 is a sectional side view of a forward part of an alternative example air intake assembly.
Figure 9:
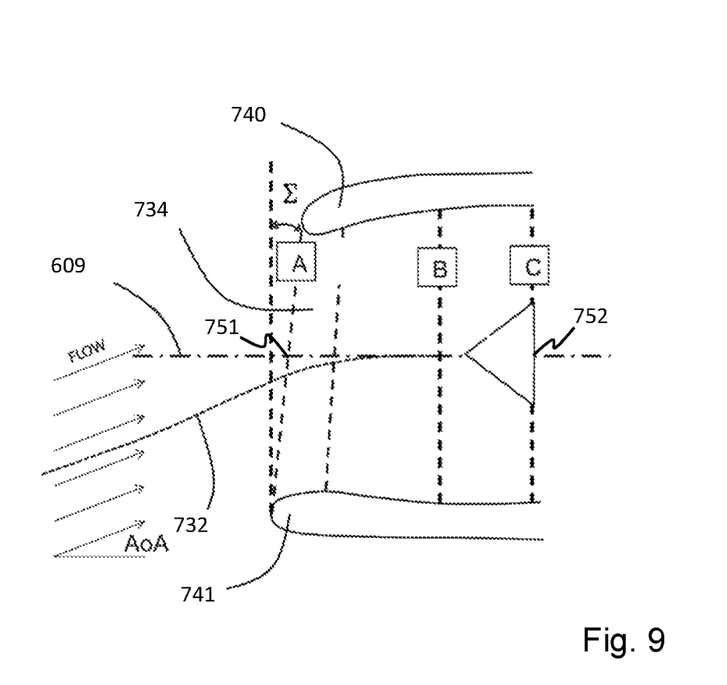
FIG. 9 is a sectional side view of a forward part of a further alternative example air intake assembly.

In alternative examples, as shown in FIGS. 8 and 9, the inlet highlight A may be at an angle Σ to a plane orthogonal to the engine axis 609, which may typically be within a range from around −5 to +5 degrees. In FIG. 8, in an example of positive scarfing, the axial position of the upper intake lip 740 is further forward than the axial position of the lower intake lip 741. In FIG. 9, in an example of negative scarfing, the axial position of the lower intake lip 741 is further forward than the axial position of the upper intake lip 740. The position of the plane C in each case is as for the example in FIG. 7.

In FIGS. 7, 8 and 9 the angle of attack AoA is shown, and is defined as the angle between the direction of airflow incident to the air intake assembly 601 and the engine axis 609. The angle of attack is typically in the range of between 0 and 35 degrees.

TABLE 1

Variation of metric M with angle of attack for different fan designs.

| M Value of Fan Design | 20° Angle of Attack | 35° Angle of Attack |
|---|---|---|
| Fan 1: M = 7.5 | — | −1.1% |
| Fan 2: M = 3.5 | −0.9% | −3.1% |

Table 1 above quantifies the variation in thrust for two designs of fan operating at a 20° and 35° angle of attack, derived from numerical simulations. Both fans are connected to the same upstream intake design to isolate the role of the fan design. Fans 1 and 2 are also designed consistently in all relevant aspects apart from the M value. The fan diameter, rotational speed, cruise design point fan pressure ratio (~1.4, which is a typical current generation geared gas turbine engine) and mass flow rate are identical. Collectively, this means the thrust production at cruise (where AOA is low) of the two fans are the same. The M value effectively defines where along the blade span, from the root to tip, the thrust is being distributed. For example, a fan designed to a low value of M means more thrust is delivered in the tip compared to a high value of M. When the AOA is increased, Fan 1 with a higher M value delivers more thrust than Fan 2. Compared to cruise conditions, at high AOA the flow passing through the fan becomes heavily distorted, which numerical simulation shows has the effect of de-sensitising the fan tip. Hence, fans designed with a low M value tend to suffer from distorted flows at high AOA, and are unable to deliver as much thrust as fans designed to a high M value. In other words, for the same high AOA thrust requirement, Fan 1 with a higher M value can operate with a shorter intake and therefore save weight, drag and cruise fuel burn.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine, a compressor, and a core shaft connecting the turbine to the compressor;
a fan located upstream of the engine core, the fan comprising a plurality of fan blades mounted for rotation about an engine axis, each blade of the plurality of fan blades having a leading edge and a trailing edge extending across a span of an airflow duct from a blade root to a blade tip; and
a gearbox that receives an input from the core shaft and outputs drive to the fan so as to drive the fan at a lower rotational speed than the core shaft,
wherein the trailing edge of each blade is characterized by a metric M defined as a rate of change of an exit angle of the trailing edge between 0.4 and 0.8 of the span divided by an area averaged trailing edge angle, M being not less than 4.

2. The gas turbine engine of claim 1 wherein the metric M is not less than 5.

3. The gas turbine engine of claim 1 wherein the metric M is not greater than 80.

4. The gas turbine engine of claim 1 wherein the metric M is defined as $$M = \frac{\left(\frac{|\chi_{0.8} - \chi_{0.4}|}{0.8 - 0.4}\right)}{\tilde{\chi}}$$

where $\chi_f$ is the trailing edge angle at a fraction f from the blade root to the blade tip and $\tilde{\chi}$ is the area averaged trailing edge angle from the blade root to the blade tip.

5. The gas turbine engine (10) of claim 4 wherein $\tilde{\chi}$ is a discrete area averaged trailing edge angle defined as:

$$\tilde{\chi} = \frac{\chi_{0.1}\pi(r_{0.2}^2 - r_{hub}^2) + \chi_{0.3}\pi(r_{0.4}^2 - r_{0.2}^2) + \chi_{0.5}\pi(r_{0.6}^2 - r_{0.4}^2) + \chi_{0.7}\pi(r_{0.8}^2 - r_{0.6}^2) + \chi_{0.9}\pi(r_{tip}^2 - r_{0.8}^2)}{\pi(r_{tip}^2 - r_{hub}^2)}$$

where $r_f$ is the radius from the engine axis at a fraction f of the span from the blade root to the blade tip, the radius $r_{tip}$ being the radius at the blade tip and $r_{hub}$ the radius at the blade root.

6. The gas turbine engine of claim 1 wherein the rate of change of the trailing edge angle between 0.4 and 0.8 of the span from the blade root to the blade tip is between 60 and 150 degrees.

7. The gas turbine engine of claim 1 wherein the rate of change of the trailing edge angle between 0.4 and 0.8 of the span from the blade root to the blade tip is between 85 and 150 degrees.

8. The gas turbine engine of claim 1 wherein the rate of change of the trailing edge angle between 0.4 and 0.8 of the span from the blade root to the blade tip is between 100 and 150 degrees.

9. The gas turbine engine of claim 6 wherein the rate of change of the trailing edge angle between 0.4 and 0.8 of the span is defined as $$\left(\frac{|\chi_{0.8} - \chi_{0.4}|}{0.8 - 0.4}\right)$$

$\chi_f$ is the trailing edge angle at a fraction f of the span from the blade root to the blade tip.

10. The gas turbine engine of claim 1 wherein, at cruise conditions, a fan root pressure ratio is no greater than 1.30, 1.25 or 1.24.

11. The gas turbine engine of claim 1 wherein, at cruise conditions, a ratio between the fan root pressure ratio and a fan tip pressure ratio is less than 0.95, 0.92 or 0.9, and optionally greater than 0.7, the fan tip pressure ratio being defined as a ratio of the mean total pressure of the flow at the fan exit that subsequently flows through the bypass duct to the mean total pressure of the flow at the fan inlet.

12. The gas turbine engine of claim 1 wherein, at cruise conditions, a fan tip loading $dH/U_{tip}^2$ is within a range of from 0.25 to 0.4 $JKg^{-1}K^{-1}/(ms^{-1})^2$ where dH is an enthalpy rise across the fan and $U_{tip}$ is a velocity of the fan tip.

13. The gas turbine engine of claim 1 wherein, at cruise conditions, a bypass ratio is greater than 12, the bypass ratio being a mass flow rate through the engine of a bypass flow (B) around the core to a mass flow rate of a flow through the core.

14. The gas turbine engine of claim 1 wherein, at cruise conditions, a specific thrust of the engine is less than 100 $NKg^{-1} s^{-1}$.

15. The gas turbine engine of claim 1 wherein, for each fan blade, a ratio of the radius at the fan root to the radius the fan tip is less than 0.33.

16. The gas turbine engine of claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

17. The gas turbine engine of claim 1, wherein:
a combustor is provided downstream of the fan and compressor(s) and upstream of the turbine(s); and
a ratio of the fan root pressure ratio to an overall pressure ratio is less than 0.03, the overall pressure ratio being defined as a ratio of the mean total pressure of the flow at the inlet to the combustor to the mean total pressure of the flow at the fan inlet.

18. The gas turbine engine according to claim 17, wherein the ratio of the fan root pressure ratio to the overall pressure ratio is in a range of from 0.017 to 0.028.

19. The gas turbine engine according to of claim 1 wherein an outer diameter of the fan is greater than 240 cm.

20. The gas turbine engine according to of claim 1 wherein a ratio of intake length to an outer diameter of the fan is in the range of from 0.15 to 0.6, wherein the intake length of the engine is defined as a length along the engine axis of the airflow duct upstream of the fan.

* * * * *